United States Patent Office 3,321,477
Patented May 23, 1967

3,321,477
PURIFICATION OF MELAMINE
Daniel Hyman, Greenwich, Conn., Samuel William Tribit, Hawthorne, N.Y., and John Maurice Witheford, Wyckoff, N.J., assignors to American Cyanamid Company, Stamford, Conn., a corporation of Maine
No Drawing. Filed Sept. 8, 1964, Ser. No. 395,023
6 Claims. (Cl. 260—249.7)

This application is related to application Ser. No. 395,077, filed Sept. 8, 1964, by John Maurice Witheford.

The present invention relates to the purification of melamine. More particularly, the instant discovery concerns an improvement in the purification of melamine involving the use of small but effective amounts of hydrogen peroxide.

According to the present invention a 3 to 15% aqueous crude melamine solution is established having a temperature in the range of 80° C. to 160° C. and containing a small but effective amount of $H_2O_2$ and sufficient alkali to provide a solution pH in the range of about 9 to about 11.6. The resulting solution is filtered to remove solids and crystallized at a temperature in the range of 20° C. to 40° C. under vacuum, relatively pure melamine crystals being recovered.

The art has known for many years the beneficial effect alkali, such as sodium hydroxide, calcium hydroxide, potassium hydroxide, or the like, has in the purification of crude melamine. Elmer et al., U.S. 2,863,869, attest to this. The present invention, however, is a substantial improvement over the art.

According to an alternative embodiment of the present invention, the 3 to 15% aqueous crude melamine solution having a temperature in the range of 80° C. to 160° C. is first decolorized with carbon (Darco) and filtered through a bed of filter-aid (e.g. Hyflo diatomaceous earth) before adding the alkali and hydrogen peroxide.

The concentration of hydrogen peroxide may vary considerably, generally up to about 2 to 3%, preferably less than 0.2%.

The present invention will better be understood from the following examples:

Example 1

Forty-five grams of crude melamine crystals (ca. 10% $H_2O$; syrup color ca. 150) are dissolved in 1,000 milliliters of water at 95° C.–100° C. Enough sodium hydroxide is added to make the solution 0.00167 Normal in NaOH (pH ca. 11) and enough hydrogen peroxide to make its concentration 0.01% by weight in the solution. After about 2.5 minutes at 95° C.–100° C., the hot solution is filtered and cooled to 25° C. The resulting crystals are filtered off, washed, and dried. These purified crystals gave a syrup color test of 16.

Example 2

One hundred and fifty pounds of crude melamine crystals (syrup color test ca. 150) are slurried with 1,350 pounds of water. Enough NaOH is added to make the slurry ca. 0.00167 N (ca. pH 11) and enough $H_2O_2$ to bring its concentration to about 0.009% by weight. A crystallizer is filled initially with 1,800 pounds of water containing 55 grams NaOH (0.0017 N). The feed is passed through a heat exchanger to bring its temperature to ca. 145° C. At this temperature it is filtered, mixed with an equal weight of clear liquid recycled from the crystallizer overflow, and this mixture fed to the crystallizer which is maintained at 35° C. The purified crystals separated after crystallization give syrup color tests in the range 22–25.

The addition of hydrogen peroxide gives results as good as those obtained with about 50 times as much caustic in the absence of hydrogen peroxide.

A run similar to Example 2 but using ca. 10 times as much as $H_2O_2$ yields purified product which gives lower syrup colors in the range 15–17.

Example 3

A crude melamine slurry prepared from urea is stripped of $NH_3$ and $CO_2$ by boiling (ca. 1% urea, 0.3% $CO_2$, 1.0% $NH_3$, 400 p.p.m. HCN). The melamine crystals in the slurry give a color test of about 160. Part of the melamine crystals (about half) is removed to leave a crude slurry containing about 4% melamine. Approximately 1,000 grams of slurry are used for these tests. The pH of this stripped slurry is about 10. The slurry is heated to 90° C.–100° C. to dissolve the melamine crystals. Darco S–51 decolorizing carbon (12 grams per 1,000 grams melamine) is added and the carbon slurry kept hot for about 5 minutes, and filtered while hot through a bed of filter-aid (Hyflo diatomaceous earth).

In a second step, the hot carbon-treated solution is treated with NaOH (ca. 1.5 grams per 1,000 grams solution) and hydrogen peroxide (ca. 1 gram per 1,000 grams of solution). The treated solution is held for about 5 minutes, filtered, cooled to about 25° C., and the resultant crystals filtered off, washed, and tested for syrup color. Color values in the range 12 to 13 were obtained. The pH of the mother liquor filtered from the crystals is about 11.6.

Similar runs, but without use of hydrogen peroxide, give melamine with higher color values.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

For example, while $H_2O_2$ has been shown herein to be very effective, other additives providing an oxidizing environment are contemplated herein, in lieu of or in addition to $H_2O_2$, e.g., oxygen, air, and the like.

Among other advantages to the process of the present invention is the fact that the reduction of caustic reduces hydrolysis and concomitant melamine yield losses. Hydrolysis results in the formation of ammeline and its related compounds which must in the crystallization step contaminate the melamine crystal, thus reducing its purity and suitability for use in selected applications.

We claim:

1. A method of purifying melamine which comprises establishing a 3 to 15% aqueous crude melamine solution having a temperature in the range of 80° C. to 160° C., and containing at least about 0.09% by weight of $H_2O_2$ and sufficient alkali to provide a solution pH in the range of about 9 to about 11.6, and crystallizing the resulting solution at a temperature in the range of 20° C. to 40° C.

2. The process of claim 1 wherein said 3 to 15% aqueous crude melamine solution having a temperature in the range of 80° C. to 160° C. is first decolorized with carbon and filtered before the addition of $H_2O_2$ and alkali.

3. The process of claim 1 wherein the alkali is NaOH.

4. The process of claim 1 wherein said melamine solution is filtered after addition of $H_2O_2$ and alkali but before crystallizing.

5. The process of claim 1 wherein said crystallization is accomplished under vacuum.

6. The process of claim 1 wherein the crude melamine solution is prepared from urea.

References Cited by the Examiner
UNITED STATES PATENTS

| | | | |
|---|---|---|---|
| 2,647,119 | 7/1953 | Haworth et al. | 260—249.7 |
| 2,863,869 | 12/1958 | Elmer et al. | 260—249.7 |
| 3,055,897 | 9/1962 | Schwartz et al. | 260—249.6 |

WALTER A. MODANCE, *Primary Examiner.*

JOHN M. FORD, *Assistant Examiner.*

Dedication 3,321,477. —*Daniel Hyman*, Greenwich, Conn., *Samuel William Tribit*, Hawthorne, N.Y., and *John Maurice Witheford*, Wyckoff, N.J. PURIFICATION OF MELAMINE. Patent dated May 23, 1967. Dedication filed Mar. 4, 1983, by the assignee, *American Cyanamid Co.*

Hereby dedicates the remaining term of said patent to the Public.
[*Official Gazette May 31, 1983.*]